April 21, 1964 M. D. LISTON ETAL 3,130,302
POSITIVE TYPE INFRARED ANALYZER
Filed March 9, 1960 2 Sheets-Sheet 1
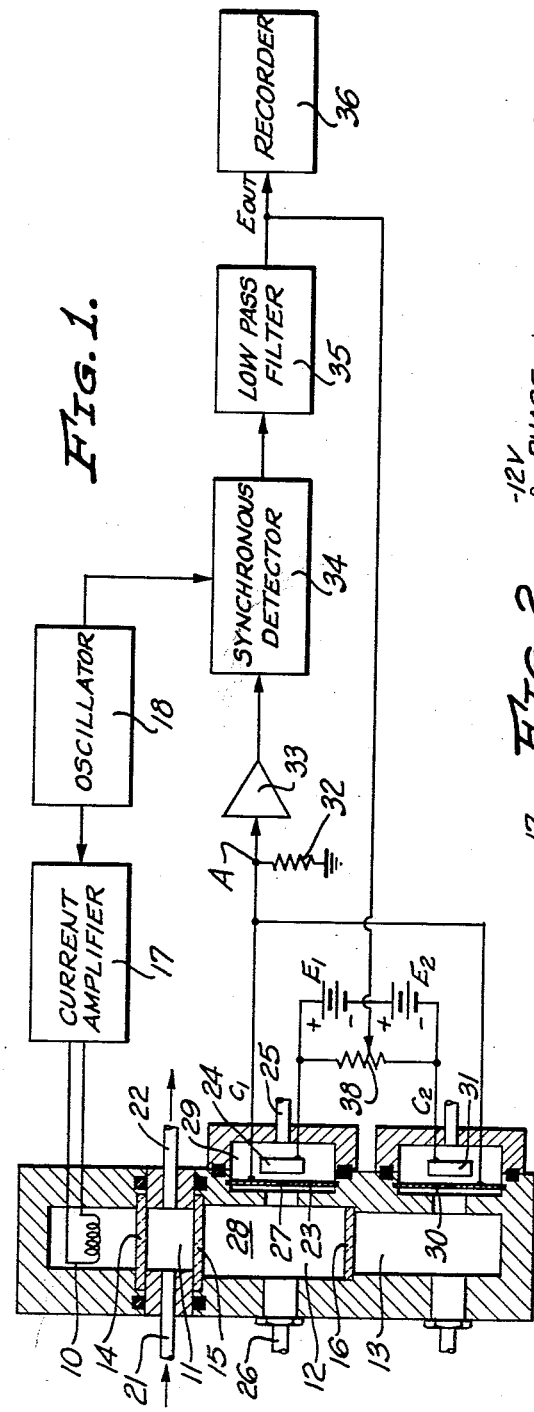
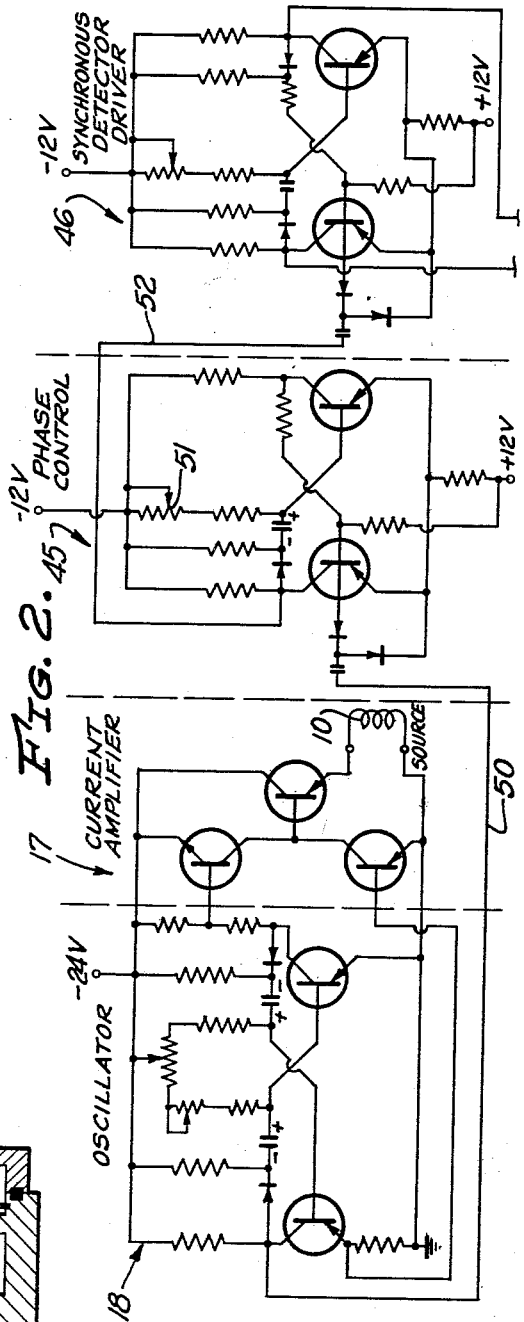
INVENTORS
MAX D. LISTON,
RAYMOND L. MADSEN
BY THEIR ATTORNEYS
HARRIS, KIECH, RUSSELL & KERN

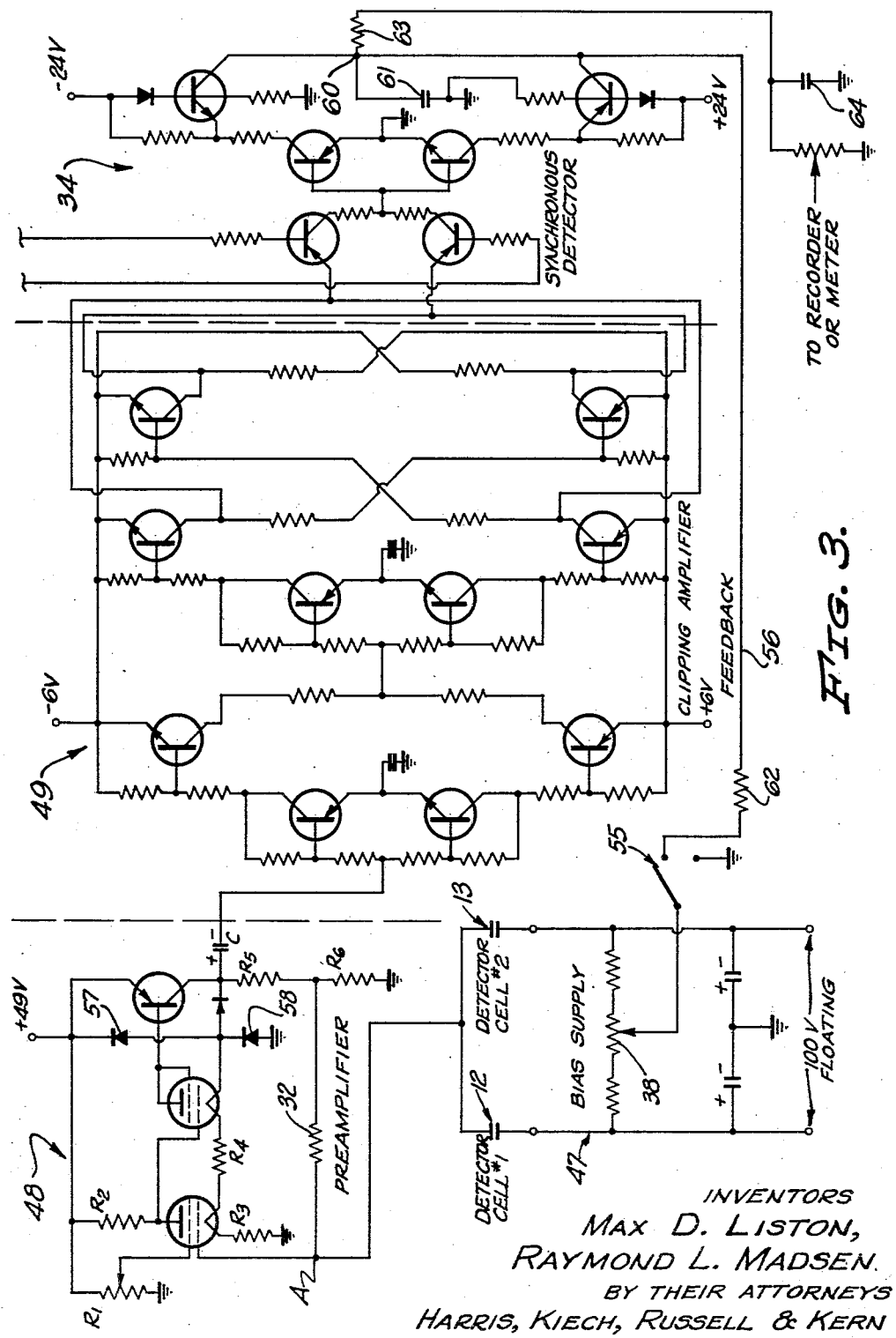

United States Patent Office 3,130,302
Patented Apr. 21, 1964

3,130,302
POSITIVE TYPE INFRARED ANALYZER
Max D. Liston, La Habra, and Raymond L. Madsen, Brea, Calif., assignors to Beckman Instruments, Inc., a corporation of California
Filed Mar. 9, 1960, Ser. No. 13,932
4 Claims. (Cl. 250—43.5)

This invention relates to analyzers of the optical type and, in particular, to positive type infrared analyzers.

In an instrument incorporating the present invention, a radiant energy source producing infrared is arranged so that radiation therefrom passes through a sample cell containing the unknown substance and through two detector cells, with the three cells arranged in optical series relation. Each of the detector cells includes a variable capacitor having plates movable relative to each other by changes in the energy of the gas within the cell, with the energy change within the cell being a function of the change in radiant energy reaching the cell.

The unknown substance in the sample cell will absorb energy in the infrared spectrum. Each of the detector cells has a different charge of gas therein, the difference in the charge being a difference in the partial pressures of the gas of interest or being a different gas. This type of cell arrangement is known in the art, see for example, the copending application of Max D. Liston entitled Instruments, Serial No. 559,950, filed January 18, 1956, now Patent No. 2,924,713, and assigned to the same assignee as the present application.

It is an object of the present invention to provide a new and improved optical analyzer and one which is less expensive to manufacture and maintain and one that is substantially trouble-free in operation.

It is an object of the invention to provide an analyzer having a radiant energy source that is pulsed or modulated rather than a source that is continuously energized. A further object is to provide such an instrument wherein the radiant energy source is energized from a square wave oscillator providing substantially 100 percent modulation.

It is an object of the invention to provide an infrared analyzer of the monobeam type utilizing D.C. polarizing voltages on the capacitors of both detector cells. A further object is to provide such an instrument wherein the polarizing voltages are connected in opposing polarities to provide signals from the two cells that are combined vectorially to provide a resultant of minimum magnitude. Another object is to provide such an instrument wherein the resultant signal produced by combining the two capacitor signals varies both in phase and amplitude as a function of the relative energy absorption in the two detector cells.

A principal object of the present invention is to provide an analyzer that is all electronic and which utilizes no moving parts or mechanical arrangements. A further object is to provide such an instrument utilizing synchronous detection of the resultant signal to provide the desired output signal, with the radiant energy source modulator or oscillator providing the reference signal for detection. A further object is to provide such an instrument that may utilize amplitude detection. Another object is to provide such an instrument that may utilize phase detection. It is also an object of the invention to provide a new and improved phase detector circuit for use with optical analyzers.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:
FIG. 1 is a block diagram of a preferred form of monobeam infrared analyzer incorporating the invention; and
FIGS. 2 and 3 comprise a schematic diagram of the instrument of FIG. 1.

The instrument of FIG. 1 includes a radiant energy source 10, a sample cell 11, and detector cells 12, 13. The cells are arranged in optical series relation and are separated by windows 14, 15, 16 of quartz or other material having suitable transmission characteristics.

The source 10 may be a conventional coil of resistance wire energized from a current amplifier 17 which, in turn, is driven by an oscillator 18. The oscillator is preferably a multivibrator or square wave generator providing pulsed energy and substantially 100 percent modulation to the source. The current amplifier may be a thyratron or relay but preferably is a vacuum tube or solid state amplifier.

The sample cell has an inlet 21 and an outlet 22 providing continuous flow of sample therethrough for continuous monitoring of process streams and the like. Of course, the instrument may also be used for batch measurements.

Means are provided in each detector cell for determining energy changes occurring therein. Typically the mechanical movement of a vane or plate may be converted to an electrical signal. In the preferred form shown herein, a flexible diaphragm 23 is mounted in the detector cell 12 and constitutes one plate of a capacitor C1. The other plate 24 of the capacitor is fixed in place in the cell. An outlet 25 provides for evacuation of the cell 12 and an inlet 26 provides for introduction of a new charge of gas. The diaphragm 23 responds to a volume change in the cell produced by absorption of infrared energy by the gas in the cell. The capacitor C1 is biased by a D.C. voltage E1 with capacitance variation caused by a diaphragm motion being converted to a voltage output at the point A. The response of the diaphragm is to dynamic volume change and a small hole 27 in the diaphragm maintains static pressure equilibrium between the main chamber 28 and the associated chamber 29 of the cell.

The detector cell 13 is similar to the cell 12 and has a capacitor C2 with plates 30, 31. The polarity of the bias voltage E2 for the capacitor C2 is opposite that of E1 so that the resultant signal appearing at point A is a function of the difference of the signals from the two capacitors, and hence is a minimum. The resistor 32 provides a D.C. path for the bias voltage on the capacitors.

The resultant voltage appearing at point A is connected through an amplifier 33 to a detector 34, preferably of the synchronous type. The output from the oscillator 18 is also connected to the detector as a reference signal. The detector output is passed through a filter 35 to a recorder 36 or other output device. The output voltage $E_{out}$ is also connected back to the bias voltages E1, E2, in negative feedback relation. A potentiometer 38 may be connected across the voltages E1, E2, with its arm connected to the output voltage to serve as a zero adjustment.

In a typical operation of the instrument, the first detector cell 12 is charged with CO, the gas to be analyzed for, and the second detector cell 13 is charged with $N_2O$, a gas that is inert or nonabsorptive at wave lengths where the gas of interest is absorptive. With the sample cell empty or with an inert gas passing therethrough, the source 10 is pulsed at a rate of two cycles per second and the output of the instrument is adjusted for zero by the potentiometer 38. The pulsed or modulated source produces time-varying signals at the capacitors C1 and C2 which are approximately 180° out of phase. The particular oscillation frequency for energizing the source is not critical and is determined primarily by the thermal response rate of the infrared source.

Then the sample to be analyzed is passed through the sample cell 11 and when CO gas is present in the sample, infrared energy will be absorbed in the sample cell rather than in the first detector cell. This change in the amount of energy absorbed results in a relative change in the time-varying changes of the two capacitors and, hence, an output at the point A. This output is a measure of the quantity of CO, sometimes referred to as the unknown substance, in the sample passing through the sample cell.

Various means may be used to detect and record this signal. Preferably, the instrument will provide means for detecting the relative amplitudes of the two alternating signals from the two capacitors such that the indicated output of the instrument is proportional to the difference of the two signals divided by the sum of the two signals. This relation makes the output of the instrument insensitive to source illumination variations caused by dirt on cell windows, power fluctuations to the source, variations in the source emission, and flat loss through a nonabsorbing gas in the sample cell.

$E_{out}$ should be a D.C. voltage proportional to $$\frac{dc1}{\Delta C1} - \frac{dc2}{\Delta C2}$$

where $dc1$ and $dc2$ are changes in $\Delta C1$ and $\Delta C2$, respectively, caused by gas in the sample cell, and $\Delta C1$ and $\Delta C2$ are changes in capacitance of C1 and C2, respectively, caused by the modulation of the radiant energy source.

If the amplifier 33 is high gain and linear, $$E_{out} = \frac{K1E1\Delta C1 - K2E2\Delta C2}{K1\Delta C1 + K2\Delta C2} \quad (1)$$

where K1 and K2 are constants.

The reference value of $E_{out}$ (i.e., the value for an inert gas in the sample cell) can be made any arbitrary value by adjustment of the bias voltage E1 and E2 and by adjustment of the phasing of the synchronous detector (which changes K1 relative to K2). Ordinarily, the reference value for $E_{out}$ is zero and $$K1E1\Delta C1 = K2E2\Delta C2 \quad (2)$$

If it is assumed that $dc1$ and $dc2$ are small changes in $\Delta C1$ and $\Delta C2$, respectively, caused by gas in the sample cell (which assumption is valid in present day instruments), then Equation 1 becomes $$E_{out} = \frac{E1E2}{E1+E2}\left(\frac{dc1}{\Delta C1} - \frac{dc2}{\Delta C2}\right) \quad (3)$$

Hence, it is seen that the present instrument provides the desired output indication.

For maximum $E_{out}$, E1 should be equal to E2 and be as large as possible. Then the phasing of the detector can be used for coarse adjustment of reference value of $E_{out} = 0$, and the relative values of E1 and E2 can be used for fine adjustment.

The system described above utilizes the change in amplitude of the resultant signal, with the detector 34 functioning as an amplitude detector. This system works particularly well when the signals from the two capacitors are exactly 180° out of phase. However, there is often a time lag or phase shift between the signals from detectors operated in optical series in the range of 10° to 20°. Then the two signals will be less than 180° out of phase and the resultant signal will have a much larger magnitude for the same relative change in capacitance.

This means that either the phase shift between the signals must be reduced to zero, or the amplifier 34 must handle a very large peak-to-peak swing and be linear over the range. It is difficult to control the phase shift of the cells and amplifiers with the required characteristics are expensive. However, it has been found that the phase of the resultant signal also changes as a function of the relative change in capacitance and a phase detection circuit has been developed for use with the monobeam instrument.

The diagram of FIG. 1 is also applicable to the phase detection system, with the amplifier 33 being a clipping amplifier and the detector 34 being a phase detector. The system may be operated with or without the feedback connection.

The output of a synchronous detector acting upon a square wave signal of peak-to-peak amplitude Vo produced by the clipping amplifier is $$E_{out} = Vo \, d\mathcal{Y} \quad (4)$$

where $d\mathcal{Y}$ is the phase deviation of the resultant signal from the reference condition established for $E_{out} = 0$, and $$d\mathcal{Y} = \frac{\sin \theta}{\frac{\Delta C1E1}{\Delta C2E2} + \frac{\Delta C2E2}{\Delta C2E1} - 2\cos\theta}\left[\frac{dC1}{\Delta C1} - \frac{dC2}{\Delta C2}\right] \quad (5)$$

$\theta$ is the phase difference or phase shift between the two capacitor signals due to the time lag between the cells.

With feedback around the detector cells, as in the amplitude detector system, $$E_{out} = \frac{E1E2}{E1+E2}\left(\frac{dc1}{\Delta C1} - \frac{dc2}{\Delta C2}\right) \quad (6)$$

which is the same as Equation 3. Hence, with feedback, both the amplitude and phase detection systems yield the same desired output for incremental changes in detector cell capacitances. However, it is important to note that feedback is not necessary in the phase detection system, since Equations 4 and 5 show the desired form required for an output insensitive to illumination variations, as discussed earlier. With phase detection, the peak-to-peak signal handling requirements of the amplifier 33 are greatly reduced, permitting relatively simple solid state circuitry to be utilized.

A schematic diagram of a preferred phase detection circuit is shown in FIGS. 2 and 3. Components corresponding to those of FIG. 1 are identified by the same reference numerals. The circuit includes an oscillator 18 and a current amplifier 17 for energizing the source 10. The output of the oscillator is connected through a phase control 45 and a synchronous detector driver 46 to provide the reference signal for the synchronous detector 34. A bias supply 47 provides the bias voltages for the detector cells 12, 13. The resultant signal from the cells is connected through a preamplifier 48 to a clipping amplifier 49.

The oscillator 18 is a transistor multivibrator which produces a square wave signal on line 50 to the phase control 45. The output from the oscillator is also connected to the current amplifier which consists of two transistor stages providing the necessary power for energizing the source 10.

The phase control 45 is a transistor flip-flop that is triggered by the square wave output from the oscillator 18, with the time delay of the flip-flop controlled by a variable resistor 51. This circuit provides a phase shift in the reference signal for the synchronous detector and provides the coarse adjustment for the reference output.

The output from the phase control is connected to the synchronous detector driver 46 through a line 52. The driver is another transistor flip-flop which serves as a current amplifier to provide the necessary power for the reference signal to the detector.

The bias supply 47 provides the D.C. voltages E1, E2 for the capacitors of the detector cells 12 and 13, respectively. The arm of the potentiometer 38 is connected to the arm of a switch 55 which is manually operable to connect the bias supply to the feedback line 56 or to circuit ground, as desired. The resultant signal appearing at point A is amplified in a three-stage preamplifier comprising two CK533AX vacuum tubes and a 2N372A transistor. Cathode bias is provided by a twenty-seven volt zener diode 57 and a twenty-two volt zener diode 58. The resistor 32 is typically $10^{10}$ ohms and the other components typically are as shown in Table I.

*Table I*

| | |
|---|---|
| R1 | 50K |
| R2 | 100M |
| R3 | 220 |
| R4 | 1300 |
| R5 | 30K |
| R6 | 620 |
| C mf | 100 |

The clipping amplifier 49 is a four-stage amplifier that provides a square wave output to the synchronous detector 34. The synchronous detector is a two-transistor synchronous rectifier operating as a phase detector and followed by two stages of amplification.

The output of the detector appearing at point 60 is smoothed by a filter comprising capacitor 61 and resistor 62 to provide the feedback signal. The output is also connected through a separate filter comprising the capacitor 61, resistor 63 and capacitor 64 to provide the output voltage for coupling to a recorder, meter or other output device. The separate filters are used to isolate the feedback circuit from the recorder circuit as recorders are ordinarily a relatively low impedance device.

The present invention provides a monobeam positive type infrared analyzer that produces an output which is a function only of the relative changes in capacitance of the capacitors of the serially positioned detector cells. The instrument may be all electronic with no moving parts and both an amplitude detection system and a phase detection system may be used therewith. Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a positive type infrared analyzer, the combination of: a radiant energy source; an oscillator; means interconnecting said source and said oscillator for energizing said source as a function of the output of said oscillator; a sample cell and first and second detector cells mounted in optical series for receiving radiation from said source, each of said detector cells having a capacitor therein; a floating D.C. voltage source connected between the capacitor of said first detector cell and the capacitor of said second detector cell for providing polarizing voltages on said capacitors, with each capacitor being variable as a function of the energy absorbed in the corresponding cell for producing first and second signals; means for combining said signals to produce a resultant signal which varies as a function of an unknown substance in the sample cell; an amplifier for receiving and amplifying said resultant signal; a synchronous detector having the amplified resultant signal and the output of said oscillator as inputs and producing an output which is a function of said resultant signal; a filter for said synchronous detector output, with the filtered output being a measure of the unknown substance in the sample cell; and means for connecting said filtered output to said capacitors and to said D.C. voltage source for controlling the polarizing voltages on said capacitors to cause said resultant signal to approach zero.

2. In a positive type infrared analyzer, the combination of: a radiant energy source; an oscillator; means for energizing said source as a function of the output of said oscillator; a sample cell and first and second detector cells mounted in optical series for receiving radiation from said source, each of said detector cells having a capacitor therein; a floating D.C. voltage source connected between the capacitor of said first detector cell and the capacitor of said second detector cell for providing polarizing voltages for said capacitors, with each capacitor being variable as a function of the energy absorbed in the corresponding cell for producing first and second signals; means for combining said signals vectorially to produce a minimum resultant signal; a clipping amplifier for said resultant signal; a synchronous detector having the amplified resultant signal and the output of said oscillator as inputs and producing an output which is a function of the magnitude of said resultant signal; a filter for said synchronous detector output, with the filtered output being a measure of the unknown substance in the sample; and means including an impedance connected in parallel with said D.C. voltage source for coupling said filtered output to said capacitors and to said D.C. voltage source for controlling the polarizing voltages on said capacitors to cause said resultant signal to approach zero.

3. In a positive type infrared analyzer, the combination of: a radiant energy source; an oscillator; means interconnecting said source and said oscillator for energizing said source as a function of the output of said oscillator; a sample cell and first and second detector cells mounted in optical series for receiving radiation from said source, each of said detector cells having a capacitor therein, with each of said capacitors having first and second electrodes; a floating D.C. voltage source having first and second terminals respectively connected to the first terminals of said capacitors, said voltage source providing polarizing voltages on said capacitors, with each capacitor being variable as a function of the energy absorption in the corresponding cell for producing first and second signals; means interconnecting the second electrodes of said capacitors for combining said signals to produce a resultant signal which varies as a function of an unknown substance in said sample cell; an amplifier for receiving and amplifying said resultant signal; a synchronous detector having the amplified resultant signal and the output of said oscillator as inputs and producing an output which is a function of said resultant signal; a filter for said synchronous detector output, with the filtered output being a measure of the unknown substance in said sample cell; and means for connecting said filtered output to said D.C. voltage source for controlling the polarizing voltages on said capacitors to cause said resultant signal to approach zero.

4. In a positive type infrared analyzer the combination of: a radiant energy source; an oscillator producing an output signal; means interconnecting said source and said oscillator for cyclically energizing said source; a sample cell and first and second detector cells mounted in optical series relationship for receiving radiation from said source; a capacitor in each of said detector cells, each capacitor having first and second electrodes; a D.C. voltage source having first and second terminals; the first electrodes of said capacitors connected to the first and second terminals of said source and the second electrodes being interconnected and connected through an impedance to a D.C. reference potential and each of said capacitors being variable as a function of the energy absorbed in the corresponding cell, the differential capacity variations being a function of the presence of a substance to be analyzed in said sample cell; an amplifier connected to the second electrodes of said capacitors to receive voltage variations occurring thereon as an error signal and producing an A.C. amplified output as a function thereof; a synchronous rectifier receiving said A.C. amplified output and the output signal of said oscillator as inputs so as to produce a D.C. output; filtering means for said D.C. output; a potential divider having end terminals connected to the end terminals of said D.C. voltage source and a tap terminal connected to said filtering means for providing polarizing potentials, with respect to said reference potential, across each of said capacitors; the absolute magnitudes of said polarizing potentials varying in opposite sense as a function of said output so as to reduce to a minimum value the voltage fluctuation at the interconnected second electrodes of said capacitors that constitutes said error signal.

References Cited in the file of this patent

UNITED STATES PATENTS

| | | |
|---|---|---|
| 1,878,891 | Robinson | Sept. 20, 1932 |
| 2,032,588 | Miller | Mar. 3, 1936 |
| 2,924,713 | Liston | Feb. 9, 1960 |
| 2,925,007 | Silver | Feb. 16, 1960 |
| 2,938,118 | Martin | May 24, 1960 |
| 2,974,227 | Fisher et al. | Mar. 7, 1961 |
| 2,974,230 | Harris | Mar. 7, 1961 |
| 3,025,746 | Cary et al. | Mar. 20, 1962 |
| 3,043,956 | Cohen | July 10, 1962 |
| 3,051,836 | Howard | Aug. 28, 1962 |